United States Patent
Cleary et al.

(10) Patent No.: US 8,789,392 B2
(45) Date of Patent: Jul. 29, 2014

(54) APPARATUS FOR SHAPING GLASS AND METHODS

(75) Inventors: Thomas M. Cleary, Elmira, NY (US); Larry G. Smith, Tulsa, OK (US); John C. Thomas, Elmira, NY (US)

(73) Assignee: Corning Incorporated, Corning, NY (US)

( * ) Notice: Subject to any disclaimer, the term of this patent is extended or adjusted under 35 U.S.C. 154(b) by 142 days.

(21) Appl. No.: 13/485,330

(22) Filed: May 31, 2012

(65) Prior Publication Data

US 2013/0319046 A1 Dec. 5, 2013

(51) Int. Cl.
*B65G 49/06* (2006.01)
*C03B 35/24* (2006.01)

(52) U.S. Cl.
CPC ............. *B65G 49/065* (2013.01); *C03B 35/24* (2013.01)
USPC .......................................... 65/182.2; 65/25.4

(58) Field of Classification Search
CPC .... C03B 35/145; C03B 35/24; B65G 49/061; B65G 49/065
USPC ......... 65/25.4, 182.2; 198/717, 721; 226/97.3
See application file for complete search history.

(56) References Cited

U.S. PATENT DOCUMENTS

| | | | |
|---|---|---|---|
| 2,840,953 A | 7/1958 | Black | 49/67 |
| 3,402,037 A * | 9/1968 | McMaster | 65/182.2 |
| 3,584,734 A | 6/1971 | Richards | 198/180 |
| 3,827,547 A * | 8/1974 | Nixon | 198/721 |
| 4,058,200 A | 11/1977 | Frank | 198/382 |
| 4,437,872 A * | 3/1984 | McMaster et al. | 65/104 |
| 4,493,412 A | 1/1985 | Krehnovi | 198/434 |
| 4,596,592 A | 6/1986 | Frank | 65/273 |

(Continued)

FOREIGN PATENT DOCUMENTS

| | | | |
|---|---|---|---|
| EP | 1256552 | 11/2002 | C03B 35/16 |
| JP | H06-144855 | 5/1994 | C03B 23/023 |

(Continued)

OTHER PUBLICATIONS

Machine Translation of JP 2005-187217. Original publication Jul. 14, 2005. Accessed Dec. 9, 2013.*

(Continued)

*Primary Examiner* — Matthew Daniels
*Assistant Examiner* — Cynthia Szewczyk
(74) *Attorney, Agent, or Firm* — Ryan T. Hardee

(57) ABSTRACT

An apparatus for shaping a glass sheet includes an engagement member including a flexible bumper comprising a flexible material. The flexible bumper is configured to operate at the forming temperature to reduce an impact stress between the engagement member and the edge portion of the glass sheet. In another example, an apparatus for shaping a sheet of glass includes a push member configured to engage an end edge portion of the glass sheet to push the glass sheet to be transported over the support surface. The push member includes a push flange extending in a direction away from the support surface. The push flange includes a plurality of apertures configured to increase the resistance of conductive heat transfer between the end edge portion of the glass sheet and the push member. In a further example an engagement member can fabricated from a material having a coefficient of thermal conductivity that is less than a coefficient of thermal conductivity of the stainless steel. In further examples, methods include using the apparatus to shape a glass sheet.

25 Claims, 5 Drawing Sheets

(56) References Cited

U.S. PATENT DOCUMENTS

| | | | | |
|---|---|---|---|---|
| 4,895,244 A | | 1/1990 | Flaugher | 198/394 |
| 4,976,766 A | | 12/1990 | Kuster | 65/289 |
| 5,066,321 A | * | 11/1991 | Kramer et al. | 65/182.2 |
| 5,246,477 A | | 9/1993 | Kramer | 65/273 |
| 5,411,128 A | | 5/1995 | Vild | 198/345.1 |
| 5,413,204 A | | 5/1995 | Mori | 198/345.1 |
| 5,669,953 A | * | 9/1997 | Schnabel et al. | 65/182.2 |
| 5,887,923 A | * | 3/1999 | Gardner, III | 294/81.55 |
| 6,014,873 A | | 1/2000 | Hirotusu et al. | 65/104 |
| 6,213,704 B1 | * | 4/2001 | White et al. | 414/217 |
| 6,419,075 B1 | | 7/2002 | Ramirez-Martinez | 198/411 |

FOREIGN PATENT DOCUMENTS

| | | | | |
|---|---|---|---|---|
| JP | 2005-187217 | | 7/2005 | C03B 35/24 |
| JP | 2006248882 A | * | 9/2006 | |
| WO | WO 2010/104698 | | 9/2010 | C03B 23/025 |

OTHER PUBLICATIONS

Engineering Toolbox, "Thermal Conductivity of some common Materials", http://www.engineeringtoolbox.com/thermal-conductivity-d_429.html, Accessed Dec. 16, 2013.*

GLT Products, Innovation Insulation Systems, "High Temperature Fabrics", hhtp://www.gltproducts.com/products/high temperature fabrics/c1-1799.

International Search Report and Written Opinion dated Aug. 23, 2013, International Application No. PCT/US2013/042578, International Filing Date May 24, 2013.

* cited by examiner

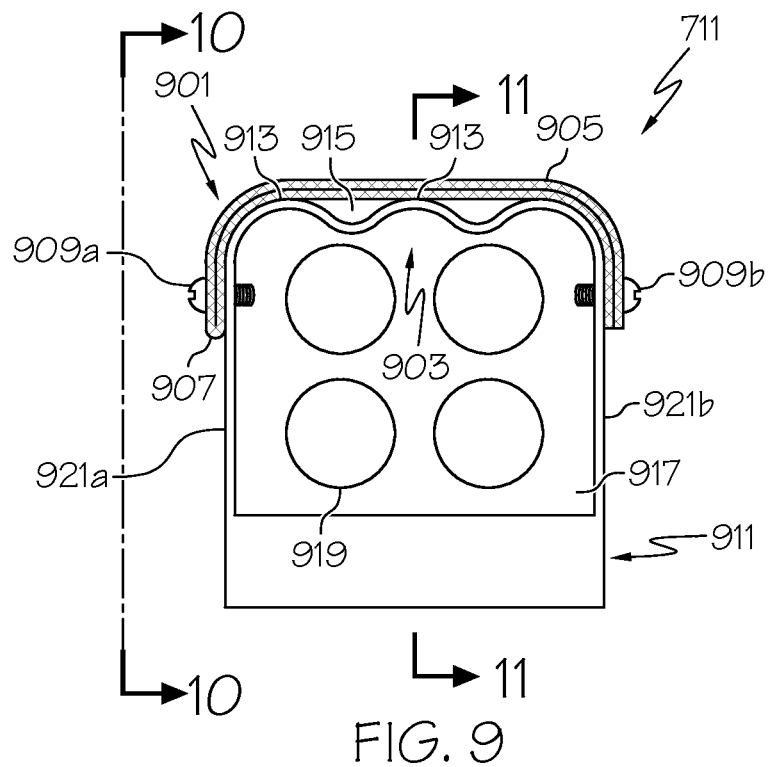
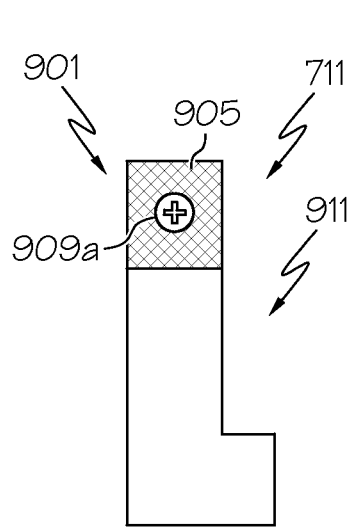
FIG. 10
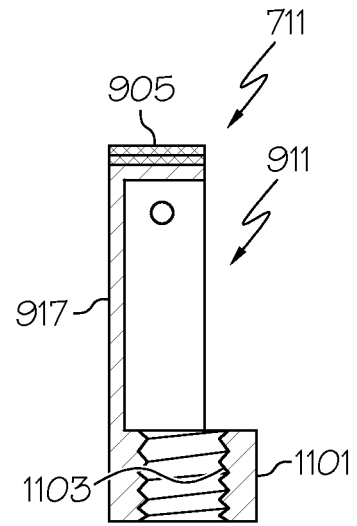
FIG. 11

APPARATUS FOR SHAPING GLASS AND METHODS

BACKGROUND

1. Field of the Invention

The present invention relates generally to apparatus and methods for shaping glass and, more particularly, to apparatus and methods for shaping glass including an engagement member with a flexible bumper and/or a push flange including a plurality of apertures.

2. Technical Background

As shown in FIGS. 1 and 2, it is known to provide an apparatus 101 for shaping a sheet of relatively thick glass sheet 103 having a thickness of greater than 1.6 mm, such as soda-lime glass having a thickness of from about 3.2 mm to about 6 mm. In operation, support pads 105 are provided for a supporting a lateral edge portion 107 of the glass sheet 103 due to the weight of the glass sheet 103 being levitated over a support surface 109. A push pad 111 is also provided to push an end edge portion 113 of the glass sheet 103 to force the glass sheet 103 to be pushed in the travel direction 115 into a heating device 117. The glass sheet 103 is levitated by an air cushion 201 over the support surface 109 by pressurized air 203.

FIG. 3 illustrates a conventional support pad 105 that is fabricated from stainless steel. The conventional support pad 105 comprises a rigid member with a plurality of flanges 301, 303, 305 and a back flange 307. The back flange 307 includes a plurality of apertures 309.

FIGS. 4-6 illustrate the conventional push pad 111. The push pad is likewise fabricated from stainless steel and includes a plurality of flanges 401, 403, 405 and a back flange 407. Unlike the flanges 401, 403, 405, the back flange 407 includes a plurality of apertures 409. As shown in FIG. 5, each of the push and support pad 105, 111 include a mounting structure 501 with a threaded bore 503 that may be mounted to a drive chain of the apparatus 101.

The support pad 105 and push pad 111 can be beneficial in certain applications but may cause damage (e.g., cracking) to relatively thin glass sheets and/or glass sheets having poor edge quality.

SUMMARY

In one example aspect, an apparatus for shaping a glass sheet includes a heating device configured to maintain the glass sheet at a forming temperature of from about 450° C. to about 760° C. The apparatus includes a support surface configured to provide a fluid cushion between a surface of the glass sheet and the support surface to levitate the glass sheet over the support surface while the heating device maintains the glass sheet at the forming temperature. The apparatus further includes an engagement member including a flexible bumper comprising a flexible material. The engagement member is configured to engage an edge portion of the glass sheet as the glass sheet is transported over the support surface. The flexible bumper is configured to operate at the forming temperature to reduce an impact stress between the engagement member and the edge portion of the glass sheet.

In one example aspect, the flexible bumper is mounted to a base of the engagement member, wherein the flexible bumper includes a volumetric coefficient of thermal conductivity that is less than a volumetric coefficient of thermal conductivity of the base.

In another example of the aspect, the flexible material includes metal, such as stainless steel.

In still another example of the aspect, the flexible material includes a woven material.

In another example of the aspect, the engagement member includes an edge support member configured to engage a lateral edge portion of the glass sheet to counter a lateral edge force of the glass sheet when the glass sheet is being transported over the support surface. The flexible bumper includes a flexible lateral edge bumper configured to reduce an impact stress between the edge support member and the lateral edge portion of the glass sheet.

In another example of the aspect, the edge support member includes an outward support segment including a plurality of support apexes and a plurality of valleys that are each positioned between a corresponding pair of the support apexes. The flexible lateral edge bumper is positioned with respect to the outward support segment to engage the support apexes without engaging the valleys of the outward support segment.

In a further example of the aspect, the engagement member includes a push member configured to engage an end edge portion of the glass sheet to push the glass sheet to be transported over the support surface. The flexible bumper comprises a flexible end edge bumper configured to reduce an impact stress between the push member and the end edge portion of the glass sheet.

In still another example of the aspect, the member includes a push flange including a plurality of apertures, wherein the end edge bumper is positioned to cover the plurality of apertures.

In another example of the aspect, a method of using the apparatus is provided including the step (I) of levitating the glass sheet over the support surface with a fluid cushion. The method further includes the step (II) of engaging the edge portion of the glass sheet with the flexible bumper of the engagement member while the edge portion of the glass sheet and the flexible bumper are maintained at the forming temperature of from about 450° C. to about 760° C. with the heating device. The method still further includes the step (III) of shaping the glass sheet as the glass sheet is moved over the support surface while the edge portion of the glass sheet is engaged with the flexible bumper of the engagement member.

In one example of the aspect, step (II) includes engaging the flexible bumper against a lateral edge portion of the glass sheet to counter a lateral edge force resulting from a weight of the glass sheet.

In another example of the aspect, step (II) includes engaging the flexible bumper against an end edge portion of the glass sheet such that step (III) includes shaping the glass sheet as the glass sheet is pushed over the support surface by the flexible bumper pushing against the end edge portion of the glass sheet.

In yet another example aspect, the glass sheet includes a thickness of from about 0.3 mm to about 1.6 mm.

In another example aspect, an apparatus for shaping a sheet of glass comprises a heating device configured to maintain a glass sheet at a forming temperature. The apparatus further includes a support surface configured to provide a fluid cushion between a surface of a glass sheet and the support surface to levitate the glass sheet over the support surface while the heating device maintains the glass sheet at the forming temperature. The apparatus further includes a push member configured to engage an end edge portion of the glass sheet to push the glass sheet to be transported over the support surface. The push member includes a push flange extending in a direction away from the support surface. The push flange includes a plurality of apertures configured to increase the resistance of conductive heat transfer between the end edge portion of the glass sheet and the push member.

In an example of the aspect, the push member further includes a flexible end edge bumper configured to reduce an impact stress between the push member and the end edge portion of the glass sheet.

In a further example of the aspect, the flexible end edge bumper is positioned to cover the plurality of apertures.

In another example of the aspect, the flexible material comprises metal, such as stainless steel.

In another example of the aspect, the flexible material comprises a woven material.

In still another example of the aspect, the apparatus further comprises an edge support member configured to engage a lateral edge portion of the glass sheet to counter a lateral edge force of the glass sheet when the glass sheet is being transported over the support surface. The apparatus also includes a flexible lateral edge bumper configured to reduce an impact stress between the edge support member and the lateral edge portion of the glass sheet.

In yet another example of the aspect, the edge support member includes an outward support segment including a plurality of support apexes and a plurality of valleys that are each positioned between a corresponding pair of the support apexes. The lateral edge bumper is positioned with respect to the outward support segment to engage the support apexes without engaging the valleys of the outward support segment.

On one example of the aspect, the push member is fabricated from a material having a coefficient of thermal conductivity that is less than a coefficient of thermal conductivity of stainless steel.

In another example of the aspect, wherein substantially the entire push member is fabricated from the material.

In still another example of the aspect, the material comprises a coating over a peripheral portion of a base of the push member, wherein the push member is fabricated from a material having a coefficient of thermal conductivity that is less than the coefficient of the thermal conductivity of the base of the push member.

In still another example of the aspect, a method of using the apparatus includes the step (I) of levitating the glass sheet over the support surface with a fluid cushion. The method further includes the step (II) of pushing the glass sheet along the support surface by engaging the push member with the end edge portion of the glass sheet wherein the plurality of apertures of the push flange reduce a conductive heat transfer rate between the end edge portion of the glass sheet and the push member. The method still further includes the step (III) of shaping the glass sheet as the glass sheet is moved over the support surface while the end edge portion of the glass sheet is engaged with the push member.

In another example of the aspect, the glass sheet includes a thickness of from about 0.3 mm to about 1.6 mm.

In another example aspect, an apparatus for shaping a sheet of glass comprises a heating device configured to maintain a glass sheet at a forming temperature. The apparatus further including a support surface configured to provide a fluid cushion between a surface of a glass sheet and the support surface to levitate the glass sheet over the support surface while the heating device maintains the glass sheet at the forming temperature. The apparatus further includes an engagement member configured to engage an edge portion of the glass sheet as the glass sheet is transported over the support surface, wherein the engagement member is fabricated from a material having a coefficient of thermal conductivity that is less than a coefficient of thermal conductivity of stainless steel.

In accordance with one example of the aspect, substantially the entire engagement member is fabricated from the material.

In accordance with another example of the aspect, the material comprises a coating over a peripheral portion of a base of the engagement member, wherein the engagement member is fabricated from a material having a coefficient of thermal conductivity that is less than the coefficient of the thermal conductivity of the base of the engagement member.

BRIEF DESCRIPTION OF THE DRAWINGS

These and other features, aspects and advantages of the present invention are better understood when the following detailed description of the invention is read with reference to the accompanying drawings, in which:

FIG. 9 illustrates a front view of an example edge support member of the apparatus of FIG. 7;

FIG. 10 illustrates a side view of the edge support member along line 10-10 of FIG. 9;

FIG. 11 illustrates a cross section of the edge support member along line 11-11 of FIG. 9;

DETAILED DESCRIPTION OF THE INVENTION

Figure 1:
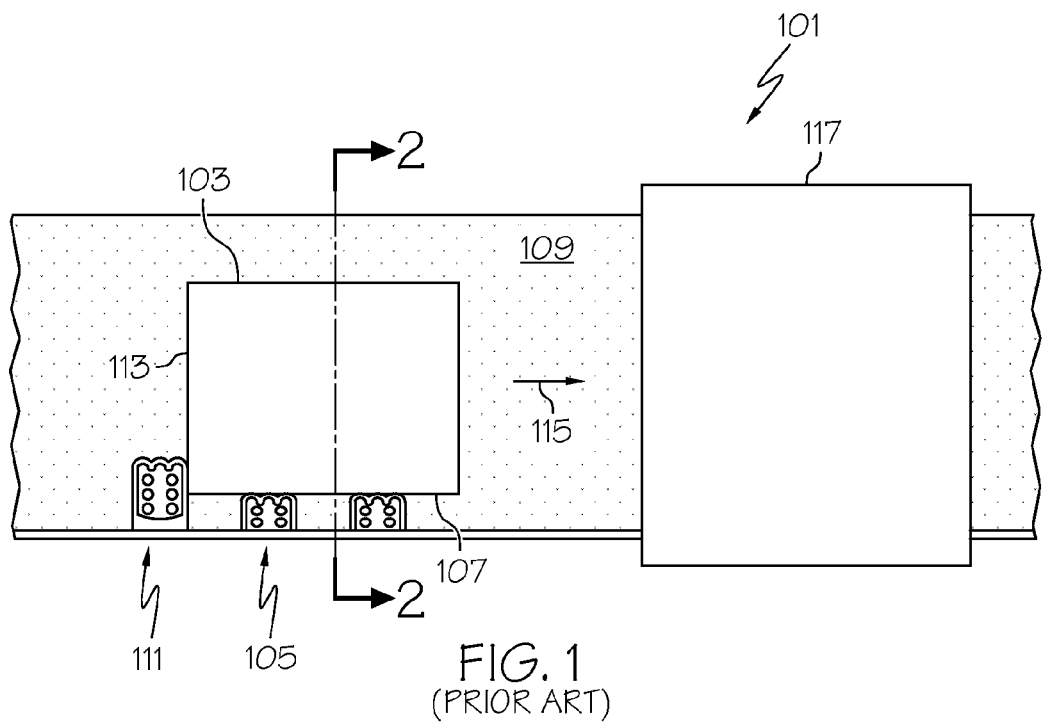
FIG. 1 illustrates a conventional apparatus for shaping a glass sheet.
Figure 2:
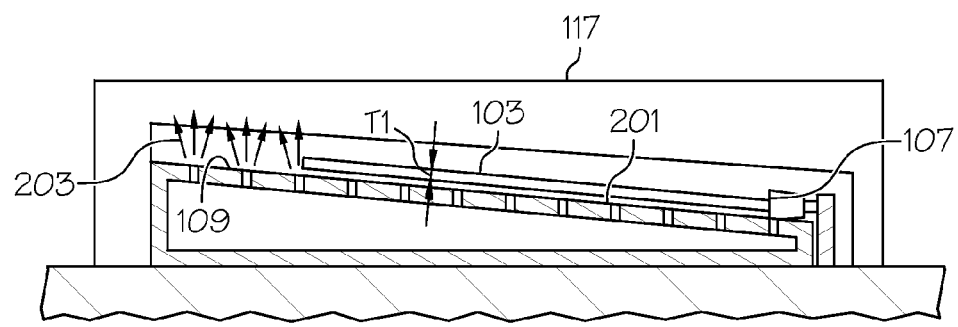
FIG. 2 is a cross section of the conventional apparatus along line 2-2 of FIG. 1.
Figure 3:
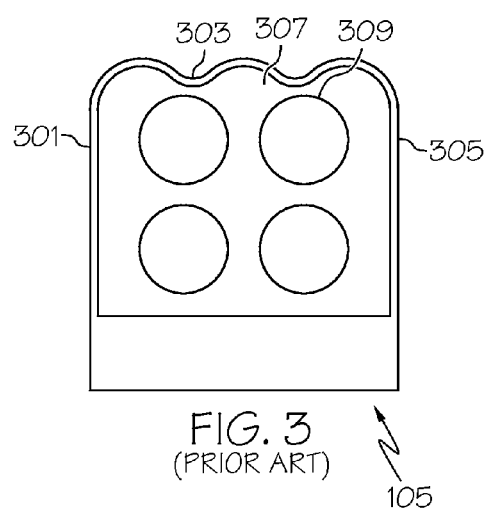
FIG. 3 illustrates a conventional edge support member of the apparatus of FIG. 1.
Figure 4:
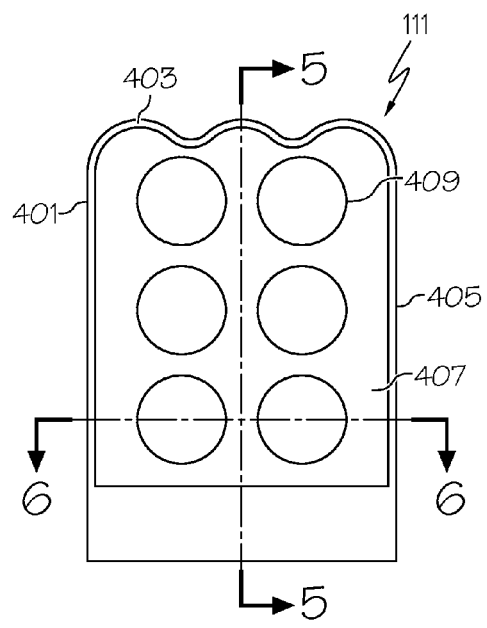
FIG. 4 illustrates front view of a conventional push member of the apparatus of FIG. 1.
Figure 5:
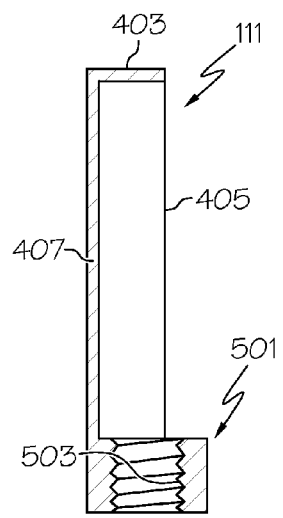
FIG. 5 is a cross section of the conventional push member along line 5-5 of FIG. 4.
Figure 6:
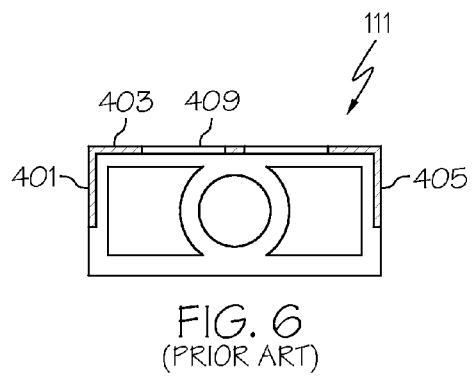
FIG. 6 is a cross section of the conventional push member along line 6-6 of FIG. 4.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Features of the present disclosure may be useful in various applications such as transporting glass on an airbed during a bending process. Bending glass sheets may provide predetermined complex glass shapes for automotive window glass applications although other applications may be provided in further examples. Moreover, the glass sheets may include various glass compositions. For example, aspects of the present disclosure can be used to transport glass sheets including soda lime glass, strengthened glass (e.g., ion exchanged class), or other glass compositions.

Apparatus and methods of the present disclosure may be useful for shaping glass sheets having various thicknesses. For instance, aspects of the present disclosure may be useful for relatively thick glass sheets having a thickness "T1" shown in FIG. 1 of greater than 1.6 mm, such as from about 3.2 to about 6 mm, such as from about 3.8 mm to about 4.7 mm. Apparatus herein may be particularly useful for relatively thick glass sheets with poor edge quality that render the glass sheet prone to fracture.

In further examples, apparatus and methods of the present disclosure may be used to transport relatively thin glass sheets with a reduced probability of damage to the glass sheet. In one example, the relatively thin glass sheets can have a thickness of less than 1.6 mm with a reduced probability of damage to the glass sheet when compared to conventional apparatus and methodologies. In further examples, the relatively thin glass sheet can have a thickness "T2" within a range of from about 0.3 mm to about 1.6 mm, such as from about 0.5 mm to about 1 mm, such as from about 0.6 mm to about 0.8 mm, such as about 0.7 mm.

Figure 7:
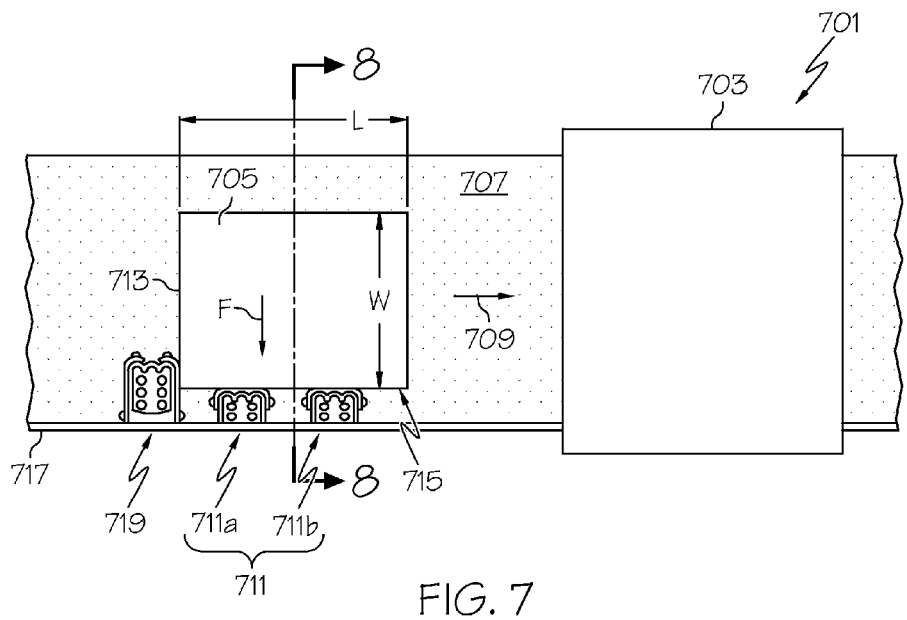
FIG. 7 illustrates an apparatus for shaping glass in accordance with aspects of the disclosure.

As shown in FIG. 7, an apparatus 701 for shaping a glass sheet 705 is provided. As shown, the apparatus 701 can include a heating device 703 configured to maintain the glass sheet 705 at a forming temperature of from about 450° C. to about 760° C. The heating device 703 can comprise a furnace that may be designed to provide controlled heating of the glass sheet 705 to the appropriate temperature for shaping and/or may maintain the glass sheet 705 at the forming temperature. In further examples, the heating device 703 may also provide controlled cooling of the glass sheet 705 once forming is complete to allow the glass sheet to transition into the final shape with reduced internal stress concentrations.

As further illustrated in FIG. 7, the apparatus 701 can also include a support surface 707 configured to support the glass sheet 705 as the glass sheet is transported along direction 709 toward the heating device 703. As shown, the support surface 707 can remain substantially stationary with respect to the heating device 703 while the glass sheet 705 is transported along the direction 709.

Figure 8:
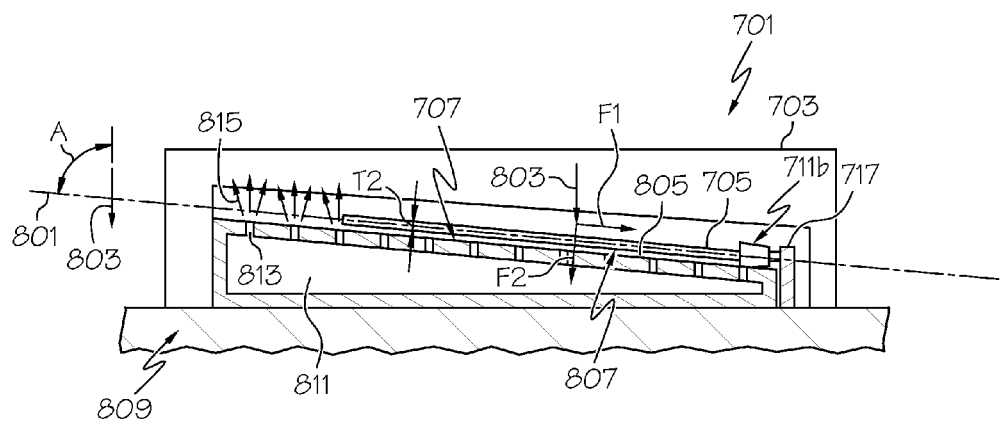
FIG. 8 is a cross section of the apparatus along line 8-8 of FIG. 7.

The glass sheet 705 can optionally be transported at a horizontal orientation with respect to the force of gravity. Alternatively, as shown in FIG. 8, the glass sheet 705 may optionally extend along a glass plane 801 that extends at an angle "A" of from about 85° to about 86° with respect to the direction 803 of gravity. Angling the glass plane 801 relative to the direction 803 of gravity can promote a slight lateral force vector "F1" to influence the glass sheet to travel in the direction of the force vector "F1" to allow the glass sheet 705 to rest against one or more edge support members 711. At the same time, the relatively large angle "A" allows a significant amount of the weight of the glass sheet 705 to be directed along a normal force vector "F2" relative to the support surface 707. The significant normal force vector "F2" can help promote shaping of the glass sheet 705 under the weight of the glass sheet as the heating device maintains the glass sheet at the forming temperature.

As further shown in FIG. 8, the support surface 707 can be configured to provide a fluid cushion 805 between a surface 807 of the glass sheet 705 and the support surface 707 to levitate the glass sheet 705 over the support surface 707 while the heating device 703 maintains the glass sheet 705 at the forming temperature. For example, as shown in FIG. 8, the support surface 707 can be provided as part of a support device 809 including an interior pressure chamber 811 in fluid communication with a plurality of apertures 813 defined in the support surface 707. As such, in one example, the support surface 707 can provide touchless support of the glass sheet 705.

In further examples the apparatus 701 can include one or more engagement members 711, 719. In just one example, the engagement member may comprise an edge support member 711 configured to engage a lateral edge portion 715 of the glass sheet 705 to counter a lateral force vector "F1" generated by the weight of the glass sheet 705 on the angled support surface 707. As shown, the edge support member 711 can comprise a first edge support member 711a and a second edge support member 711b although a single or more than two edge support members may be provided in further examples.

The edge support member 711 may be configured to counter the lateral force vector "F1" when the glass sheet 705 is being transported over the support surface 707. For example, as schematically shown in FIGS. 7 and 8, the edge support member 711 may be connected to a drive apparatus, such as the illustrated chain drive apparatus 717. The chain drive apparatus can be configured to move the edge support member 711 together with the glass sheet 705 in the direction 709. As such, the glass sheet 705 may be transported in direction 709 with little or no relative movement between the glass sheet 705 and the engagement members 711, 719.

FIG. 9 illustrates a front view of the example edge support member 711 of the apparatus 701 shown in FIG. 7. The edge support member 711 can include a flexible bumper comprising a flexible material. For instance, as shown, the flexible bumper comprises a flexible lateral edge bumper 901 configured to reduce an impact stress between the edge support member 711 and the lateral edge portion 715 of the glass sheet 705. As such, when loading the glass sheet 705 to be supported relative to the support surface 707, the glass sheet 705 may slide down the direction of the lateral force vector "F1". The glass sheet 705 can continue to slide down until the lateral edge portion 715 eventually engages the edge support member 711. An outward support segment 903 acts as a stop to prevent further movement of the glass sheet 705 and thereafter provides a support to counteract the lateral force vector "F1". The outward support segment 903 may comprise a substantially rigid member that may be provided with the flexible bumper 901 to reduce impact stresses resulting from the lateral edge portion 715 of the glass sheet 705 colliding with the edge support member 711. Indeed, due to the flexibility of the bumper 901, the bumper 901 can deform in compression as the lateral edge portion 715 of the glass sheet 705 engages the flexible bumper 901.

Still further, the flexible lateral edge bumper 901 may reduce stresses resulting in process instabilities that may cause abrupt shifting of the glass sheet 705 in the direction, or opposite to the direction, of the lateral force vector "F1." As such, the flexible lateral edge bumper 901 may be useful to reduce impact stresses that may otherwise result in cracking of the glass sheet 705 when loading of the glass sheet 705 to be supported by the support surface 707 and/or to when transporting the glass sheet 705 over the support surface 707 along direction 709.

The flexible lateral edge bumper 901 is configured to operate at the forming temperature of from about 450° C. to about 760° C. such that the edge support member 711 may travel with the glass sheet 705 through the heating device 703 as the glass sheet 705 is shaped. The flexible bumper can comprise a wide range of materials. For instance, the flexible bumper may comprise metal, such as stainless steel although other metal materials may be used in further examples. In one example, the flexible bumper can be provided as a leaf spring or other material. In the illustrated example, the flexible material comprises a woven material, such as the illustrated woven stainless steel strip 905. If provided as a woven material (e.g., stainless steel), the woven material can be flexible and can also be resilient. Optionally, the flexible strip, if provided, can be folded over itself to increase the thickness of the woven material. Indeed, as shown in FIGS. 9 and 10, the flexible trip can include a fold 907 wherein the strap extends over the top of the outward support segment 903. Each end of the folded woven strip 905 can be mounted over the outward support segment 903, for example, by way of fasteners such as the illustrated screws 909a, 909b.

In some examples, the flexible lateral edge bumper 901 can help increase the resistance of conductive heat transfer between the lateral edge portion 715 of the glass sheet 705 and a base 911 of the edge support member 711. Raising the resistance of conductive heat transfer can help minimize or prevent thermal gradients from creating stress fractures within the glass sheet 705. In some examples, the flexible bumper an any of the examples throughout the application can comprise a volumetric coefficient of thermal conductivity that is less than a volumetric coefficient of thermal conductivity of the base. For purposes of the present application "volumetric coefficient of thermal conductivity" is considered the overall coefficient of thermal conductivity of a volume of a material. As such, the volumetric coefficient of thermal conductivity can be influenced by the material coefficient of thermal conductivity and the structural configuration of the volume of material. For instance, providing the flexible lateral edge bumper 901 as a woven material can provide air spaces between the metal fibers of the fabric, thereby, helping create a thermal barrier that can increase the resistance of conductive heat transfer to help avoid thermal gradients within the glass sheet 705. As such, if the base 911 and the flexible lateral edge bumper 901 are both comprised of stainless steel, they both have the same material coefficient of thermal conductivity but the volumetric coefficient of thermal conductivity of the bumper comprising woven stainless steel would be less than the volumetric coefficient of thermal conductivity of a base comprised of solid stainless steel. Indeed, in one example, the volumetric coefficient of thermal conductivity of the base can be within a range of from the 10 s to the 100 s of W/m-K while the woven fabric stainless steel can include a volumetric coefficient of thermal conductivity of from about 0.1 to about 1 W/m-K. In further examples, woven fiberglass, glass cloth, stainless steel alloy, or other materials may be provided as the woven fabric.

Moreover, the flexible lateral edge bumper 901 can act in combination with structural features of remaining portions of the edge support member 711 to further increase the resistance of conductive heat transfer. For example, the outward support segment 903 can optionally be formed as a flange of a base 911 that can be fabricated from metal (e.g., stainless steel) or other materials configured to operate at the forming temperature. As shown in FIG. 9, in one example, the outward support segment 903 can include a plurality of support apexes 913 and a plurality of valleys 915 that are each positioned between a corresponding pair of the support apexes 913. The flexible lateral edge bumper 901 is positioned with respect to the outward support segment 903 to engage the support apexes 913 without engaging the valleys 915 of the outward support segment 903. In such examples, the combination of the flexible lateral edge bumper 901 and the apex and valley configuration of the outward support segment 903 can help increase the resistance of conductive heat transfer between the lateral edge portion 715 of the glass sheet 705 and the base 911 of the edge support member 711. Indeed, as shown in FIG. 11, only at the support apexes 913 is there a direct path between the lateral edge portion 715 and the base 911. Moreover, due to the woven nature of example flexible lateral edge bumpers, the air spaces between the metal fibers of the fabric can help thwart conductive heat transfer. As shown in FIG. 9, the increased resistance to thermal conductivity of the woven strip 905 can act in concert with the air spaces at the valleys 915 to further increase the overall resistance to thermal conductivity.

With further reference to FIG. 9, the base 911 can also optionally include a back plate 917 with a plurality of apertures 919 that may reduce the mass of the base 911 and provide a configuration designed to further increase the resistance of the conductive heat transfer between the lateral edge portion 715 and the base 911. Moreover, as shown in FIGS. 9 and 11, the back plate 917, lateral flanges 921a, 921b, and the outward support segment 903 can comprise relatively thin members to reduce the mass of the edge support member 711 and thereby minimize the capability of the edge support member 711 to conduct heat. FIG. 11 illustrates a mounting portion 1101 that can include a threaded bore 1003 configured to allow the edge support member 711 to be mounted to the drive apparatus 717.

Figure 12:
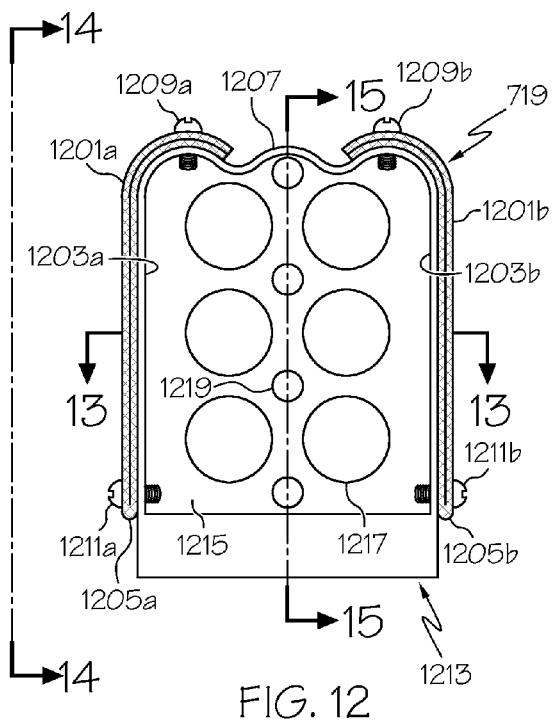
FIG. 12 illustrates a front view of an example push member of the apparatus of FIG. 7.

As shown in FIGS. 7 and 12, in another example, in addition or alternatively to the edge support member 711, the engagement member can comprise a push member 719 configured to engage an end edge portion 713 of the glass sheet 705 to push the glass sheet 705 to be transported over the support surface 707. As shown in FIG. 12, the push member 719 can include a flexible bumper comprising a flexible end edge bumper 1201a, 1201b configured to reduce an impact stress between the push member 719 and the end edge portion 713 of the glass sheet 705. Although two flexible end edge bumpers 1201a, 1201b are illustrated, in further examples a single end edge bumper may be provided in further applications.

Like the flexible lateral edge bumper 901, the flexible end edge bumpers 1201a, 1201b can operate at the forming temperature (e.g., of from about 450° C. to about 760° C.) such that the push member 719 may travel with the glass sheet 705 through the heating device 703 as the glass sheet 705 is shaped. Moreover, the flexible end edge bumpers 1201a, 1201b may be fabricated from a flexible material that can reduce an impact stress between the push member 719 and the end edge portion 713 of the glass sheet 705. As such, when initially engaging the end edge portion 713 a lateral push flanges 1203a, 1203b can act to push the glass sheet 705 in the direction 709 as the glass sheet 705 is transported relative to the support surface 707. The lateral push flanges 1203a, 1203b may comprise a substantially rigid member that extends in a direction away from the support surface 707. The push flanges 1203a, 1203b may be provided with the flexible bumper to reduce impact stresses resulting from the end edge portion 713 of the glass sheet 705 colliding with the push member 719. Indeed, due to the flexibility of the bumper, the bumper can deform in compression as the end edge portion 713 of the glass sheet 705 engages the flexible bumper.

Still further, the flexible end edge bumper 1201a, 1201b may reduce stresses resulting in process instabilities that may cause abrupt changes in pushing force applied to the glass sheet 705 in the direction 709. As such, the flexible end edge bumper 1201a, 1201b may be useful to reduce impact stresses that may otherwise result in cracking of the glass sheet 705 when beginning and/or continuing the process of pushing the glass sheet 705 along the support surface 707 in direction 709.

The flexible end edge bumper 1201a, 1201b is configured to operate at the forming temperature of from about 450° C. to about 760° C. such that the push member 719 may travel with the glass sheet 705 through the heating device 703 as the glass sheet 705 is shaped. The flexible bumper can comprise a wide range of materials that are similar or identical to the materials discussed above to fabricate the flexible lateral edge bumper 901. For example, as with the flexible lateral edge bumper 901, the flexible end edge bumpers 1201a, 1201b may each comprise a flexible strip that may optionally be folded over itself to increase the thickness of the woven material. Indeed, as shown in FIGS. 12-15, the flexible strip can include a fold 1205a, 1205b wherein the strap extends over the top portion of an outward facing segment 1207 and is mounted in place at one end by fasteners such as the illustrated screws 1209a, 1209b. The flexible strip can then extend down over the of the respective lateral push flanges 1203a, 1203b and mounted in place by way of fasteners, such as the illustrated screws 1211a, 1211b.

In some examples, the flexible end edge bumpers 1201a, 1201b can help increase the resistance of conductive heat transfer between the end edge portion 713 of the glass sheet 705 and a base 1213 of the push member 719. Raising the resistance of conductive heat transfer can help minimize or prevent thermal gradients from creating stress fractures within the glass sheet 705. For instance, providing the flexible end edge bumpers 1201a, 1201b as a woven material can provide air spaces between the metal fibers of the fabric, thereby, helping create a thermal barrier that can increase the resistance of conductive heat transfer to help avoid thermal gradients within the glass sheet 705.

Figure 15:
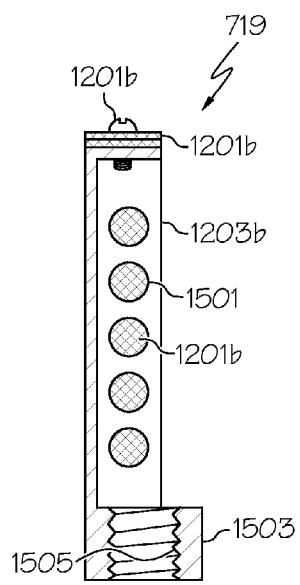
FIG. 15 is a cross section of the push member along line 15-15 of FIG. 12.

Moreover, the flexible end edge bumpers 1201a, 1201b can act in combination with structural features of remaining portions of the push member 719 to further increase the resistance of conductive heat transfer. For example, the lateral push flanges 1203a, 1203b can optionally be formed as a flange of the base 1213 that can be fabricated from metal (e.g., stainless steel) or other materials configured to operate at the forming temperature. As shown in FIG. 15, in one example, the lateral push flanges 1203a, 1203b can be provided with one or more apertures 1501 configured to increase the resistance of conductive heat transfer between the end edge portion 713 of the glass sheet 705 and the base 1213. Indeed, the lateral push flanges 1203a, 1203b can each be provided with a plurality of apertures 1501 that, as shown, can have a respective end edge bumper 1201a, 1201b positioned to cover the plurality of apertures 1501. In such examples, the combination of the apertures 1501 of the lateral push flanges 1203a, 1203b and the end edge bumpers 1201a, 1201b can help increase the resistance of conductive heat transfer between the end edge portion 713 of the glass sheet 705 and the base 1213 of the push member 719. Indeed, as shown in FIG. 15, there is no direct path for conductive heat transfer between the glass sheet and the base at the location of the apertures. Moreover, due to the woven nature of example flexible end edge bumpers, the air spaces between the metal fibers of the fabric can help thwart conductive heat transfer. Moreover, as shown in FIG. 15, the increased resistance to thermal conductivity of the woven strip 1201a, 1201b can act in concert with the air spaces at the apertures 1501 to further increase the overall resistance to thermal conductivity.

Figure 13:
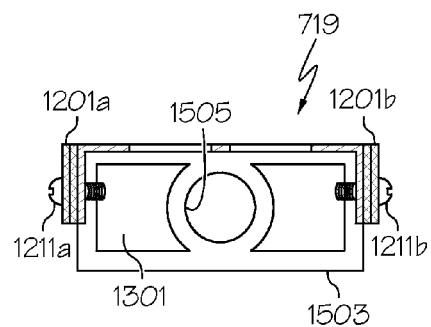
FIG. 13 is a cross section of the push member along line 13-13 of FIG. 12.
Figure 14:
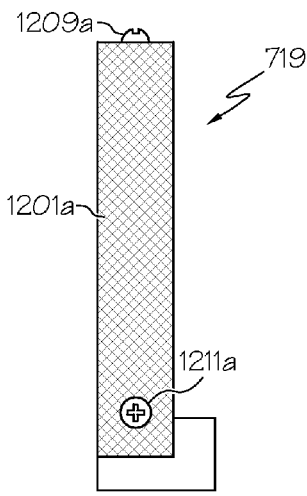
FIG. 14 is a side view of the push member along line 14-14 of FIG. 12.

As shown in FIG. 12, the base 1213 can also optionally include a back plate 1215 with a plurality of apertures 1217 that may reduce the mass of the base 1213 and provide a configuration designed to further increase the resistance of the conductive heat transfer between the end edge portion 713 and the base 1213. Still further, additional apertures 1219 may also be provided to still further increase the resistance of conductive heat transfer. Moreover, as shown in FIGS. 12, 13 and 15, the back plate 1215, push flanges 1203a, 1203b, and the outward facing segment 1207 can comprise relatively thin members to reduce the mass of the push member 719 and thereby minimize the capability of the push member 719 to conduct heat. FIG. 15 illustrates a mounting portion 1503 that can include a threaded bore 1505 configured to allow the push member 719 to be mounted to the drive apparatus 717. Moreover, as shown in FIG. 13, the mounting portion 1503 can comprise a frame structure with openings 1301 designed to further increase the resistance to heat transfer. Although not shown, similar openings may be provided in the base of the edge support member 711.

Methods of using the apparatus 701 will now be described with initial reference to FIGS. 7 and 8. In one example, the method includes the step of levitating the glass sheet 705 over the support surface 707 with a fluid cushion 805. For example, pressurized air may be forced into the interior pressure chamber, resulting in air streams 815 being emitted from the apertures 813 in the support surface 707.

In one example, the method can further include the step of engaging at least one of the edge portions 713, 715 with at least one flexible bumper 905, 1201a, 1201b of the engagement member while the edge portion of the glass sheet 705 and the flexible bumper are maintained at the forming temperature of from about 450° C. to about 760° C. with the heating device. For example, the engagement members 711, 719 can travel with the glass sheet 705 along the direction 709 into the interior of the heating device 703 such that the glass sheet 705 is raised to a forming temperature and maintained at the forming temperature. In one particular example, the method includes the step of engaging the flexible bumper 901 against the lateral edge portion 715 of the glass sheet 705 to counter the lateral edge force "F1" resulting from a weight of the glass sheet 705. In addition or alternatively, the method can further include the step of engaging the flexible bumper 1201a, 1201b against the end edge portion 713 of the glass sheet 705 such that the glass sheet 705 can be shaped as it is pushed over the support surface 707 by the flexible bumper pushing against the end edge portion of the glass sheet.

In another example, the method can include the step of pushing the glass sheet 705 along the support surface 707 by engaging the push flanges 1203a, 1203b with the end edge portion 713 of the glass sheet 705 wherein the plurality of apertures 1501 of the push flange reduce a conductive heat transfer rate between the end edge portion of the glass sheet and the push member. In some examples, the optional flexible bumper may be provided.

The method can further include the step of shaping the glass sheet as the glass sheet is moved over the support surface while the edge portion of the glass sheet is engaged with the flexible bumper of the engagement member. For example, the shape of the support surface 707 can gradually change in the direction 709 such that, once the glass sheet reaches a forming temperature, the glass sheet shape can change to match the changing shape of the support surface 707 until the final desired shape is achieved.

As discussed above, aspects of the present disclosure may include an engagement member (e.g., push member, edge support member, etc.) designed present a reduced the volumetric coefficient of thermal conductivity to reduce the heat transfer rate between the glass sheet and the base of the engagement member. As mentioned previously, in one example a flexible bumper can be provided with a reduced volumetric coefficient of thermal conductivity.

The engagement member can be fabricated from a material having a coefficient of thermal conductivity that is less than a coefficient of thermal conductivity of stainless steel. As such, the material of the engagement member can have a coefficient of thermal conductivity that is less than 10 W/m-K. For instance, as mentioned previously, woven fabric stainless steel can include a volumetric coefficient of thermal conductivity of from about 0.1 to about 1 W/m-K. In one example, substantially the entire engagement member is fabricated from the material. For instance, the entire engagement member may be fabricated from a ceramic material having a volumetric and/or material coefficient of thermal conductivity that is less than a material coefficient of thermal conductivity of stainless steel.

In a further example, the material of the engagement member can comprise a coating rather than the fabric strip illustrated in the drawings. In such an example, the fabric strip in the drawings can be considered a schematic representation of a coating over a peripheral portion of a base of the engagement member, wherein the engagement member is fabricated from a material having a coefficient of thermal conductivity that is less than the coefficient of the thermal conductivity of the base of the engagement member. In one example, the base of the engagement member can comprise stainless steel having a coefficient of thermal conductivity of the 10 s to the 100 s of W/m-K with the coating comprising a material having a lower coefficient of thermal conductivity. In one example, the coating can comprise a 0.03 inch thick Zirconia covered with a 0.1 inch thick chromia Alumina. The coefficient of thermal conductivity of the sprayed Y-Zirc can be about 0.9 W/m-K and the sprayed chromia Alumina can be about 5 watts/m-K.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for shaping a glass sheet comprising:
    a heating device configured to maintain the glass sheet at a forming temperature of from about 450° C. to about 760° C.;
    a support surface configured to provide a fluid cushion between a surface of the glass sheet and the support surface to levitate the glass sheet over the support surface while the heating device maintains the glass sheet at the forming temperature; and
    an engagement member including a flexible bumper comprising a flexible material, wherein the engagement member is configured to engage an edge portion of the glass sheet as the glass sheet is transported over the support surface, and wherein the flexible bumper is configured to operate at the forming temperature to reduce an impact stress between the engagement member and the edge portion of the glass sheet,
    wherein the engagement member comprises an edge support member configured to engage a lateral edge portion of the glass sheet to counter a lateral edge force of the glass sheet when the glass sheet is being transported over the support surface, wherein the flexible bumper comprises a flexible lateral edge bumper configured to reduce an impact stress between the edge support member and the lateral edge portion of the glass sheet, and
    wherein the edge support member includes an outward support segment including a plurality of support apexes and a plurality of valleys that are each positioned between a corresponding pair of the support apexes, wherein the flexible lateral edge bumper is positioned with respect to the outward support segment to engage the support apexes without engaging the valleys of the outward support segment.

2. The apparatus of claim 1, wherein the flexible bumper is mounted to a base of the engagement member, wherein the flexible bumper includes a volumetric coefficient of thermal conductivity that is less than a volumetric coefficient of thermal conductivity of the base.

3. The apparatus of claim 1, wherein flexible material comprises metal.

4. The apparatus of claim 3, wherein the metal comprises stainless steel.

5. The apparatus of claim 1, wherein the flexible material comprises a woven material.

6. The apparatus of claim 1, wherein the engagement member comprises a push member configured to engage an end edge portion of the glass sheet to push the glass sheet to be transported over the support surface, wherein the flexible bumper comprises a flexible end edge bumper configured to reduce an impact stress between the push member and the end edge portion of the glass sheet.

7. The apparatus of claim 6, wherein the push member includes a push flange including a plurality of apertures, wherein the end edge bumper is positioned to cover the plurality of apertures.

8. A method of using the apparatus of claim 1 to shape the glass sheet comprising the steps of:
    (I) levitating the glass sheet over the support surface with a fluid cushion;
    (II) engaging the edge portion of the glass sheet with the flexible bumper of the engagement member while the edge portion of the glass sheet and the flexible bumper are maintained at the forming temperature of from about 450° C. to about 760° C. with the heating device; and
    (III) shaping the glass sheet as the glass sheet is moved over the support surface while the edge portion of the glass sheet is engaged with the flexible bumper of the engagement member.

9. The method of claim 8, wherein step (II) includes engaging the flexible bumper against a lateral edge portion of the glass sheet to counter a lateral edge force resulting from a weight of the glass sheet.

10. The method of claim 8, wherein step (II) includes engaging the flexible bumper against an end edge portion of the glass sheet such that step (III) includes shaping the glass sheet as the glass sheet is pushed over the support surface by the flexible bumper pushing against the end edge portion of the glass sheet.

11. The method of claim 8, wherein the glass sheet includes a thickness of from about 0.3 mm to about 1.6 mm.

12. An apparatus for shaping a sheet of glass comprising:
    a heating device configured to maintain a glass sheet at a forming temperature;
    a support surface configured to provide a fluid cushion between a surface of a glass sheet and the support surface to levitate the glass sheet over the support surface while the heating device maintains the glass sheet at the forming temperature; and
    a push member configured to engage an end edge portion of the glass sheet to push the glass sheet to be transported over the support surface, the push member including a push flange extending in a direction away from the support surface, wherein the push flange includes a plurality of apertures configured to increase the resistance of conductive heat transfer between the end edge portion of the glass sheet and the push member, and an edge support member configured to engage a lateral edge portion of the glass sheet to counter a lateral edge force of the glass sheet when the glass sheet is being transported over the support surface, and a flexible lateral edge bumper configured to reduce an impact stress between the edge support member and the lateral edge portion of the glass sheet, wherein the edge support member includes an outward support segment including a plurality of support apexes and a plurality of valleys that are each positioned between a corresponding pair of the support apexes, wherein the lateral edge bumper is positioned with respect to the outward support segment to engage the support apexes without engaging the valleys of the outward support segment.

13. The apparatus of claim 12, wherein the push member further comprises a flexible end edge bumper configured to reduce an impact stress between the push member and the end edge portion of the glass sheet.

14. The apparatus of claim 13, wherein the flexible end edge bumper is positioned to cover the plurality of apertures.

15. The apparatus of claim 13, wherein flexible material comprises metal.

16. The apparatus of claim 15, wherein the metal comprises stainless steel.

17. The apparatus of claim 13, wherein the flexible material comprises a woven material.

18. The apparatus of claim 12, wherein the push member is fabricated from a material having a coefficient of thermal conductivity that is less than a coefficient of thermal conductivity of stainless steel.

19. The apparatus of claim 18, wherein substantially the entire push member is fabricated from the material.

20. The apparatus of claim 18, wherein the material comprises a coating over a peripheral portion of a base of the push member, wherein the push member is fabricated from a material having a coefficient of thermal conductivity that is less than the coefficient of the thermal conductivity of the base of the push member.

21. A method of using the apparatus of claim 12 to shape the glass sheet comprising the steps of:
(I) levitating the glass sheet over the support surface with a fluid cushion;
(II) pushing the glass sheet along the support surface by engaging the push member with the end edge portion of the glass sheet wherein the plurality of apertures of the push flange reduce a conductive heat transfer rate between the end edge portion of the glass sheet and the push member; and
(III) shaping the glass sheet as the glass sheet is moved over the support surface while the end edge portion of the glass sheet is engaged with the push member.

22. The method of claim 21, wherein the glass sheet includes a thickness of from about 0.3 mm to about 1.6 mm.

23. An apparatus for shaping a sheet of glass comprising:
a heating device configured to maintain a glass sheet at a forming temperature;
a support surface configured to provide a fluid cushion between a surface of a glass sheet and the support surface to levitate the glass sheet over the support surface while the heating device maintains the glass sheet at the forming temperature; and
an engagement member configured to engage an edge portion of the glass sheet as the glass sheet is transported over the support surface, wherein the engagement member is fabricated from a material having a coefficient of thermal conductivity that is less than a coefficient of thermal conductivity of stainless steel,
wherein the engagement member includes an outward support segment including a plurality of support apexes and a plurality of valleys that are each positioned between a corresponding pair of the support apexes, and where the engagement member includes a flexible lateral edge bumper positioned with respect to the outward support segment to engage the support apexes without engaging the valleys of the outward support segment.

24. The apparatus of claim 23, wherein substantially the entire engagement member is fabricated from the material.

25. The apparatus of claim 23, wherein the material comprises a coating over a peripheral portion of a base of the engagement member, wherein the engagement member is fabricated from a material having a coefficient of thermal conductivity that is less than the coefficient of the thermal conductivity of the base of the engagement member.

* * * * *